United States Patent [19]

Krieger

[11] Patent Number: 5,651,579
[45] Date of Patent: Jul. 29, 1997

[54] STAIRWAY FOR A MOTOR COACH

[75] Inventor: John Krieger, Los Angeles, Calif.

[73] Assignee: Motor Coach Industries Limited, Winnipeg, Canada

[21] Appl. No.: 528,157

[22] Filed: Sep. 14, 1995

[51] Int. Cl.⁶ .................................................. B62D 31/02
[52] U.S. Cl. ........................... 296/178; 296/24.1; 105/443
[58] Field of Search .................................. 296/24.1, 178; 105/443; 52/182, 187

[56] References Cited

U.S. PATENT DOCUMENTS

| 3,054,469 | 9/1962 | Muller | 296/178 X |
| 3,971,455 | 7/1976 | Molzon | 296/178 X |
| 4,114,712 | 9/1978 | Finta | 296/178 X |

FOREIGN PATENT DOCUMENTS

| 2630483 | 10/1989 | France | 52/182 |
| 197805 | 5/1978 | Germany | 296/178 |

Primary Examiner—Dennis H. Pedder
Attorney, Agent, or Firm—Larson and Taylor

[57] ABSTRACT

A stairway for a motor coach is located in one side wall of the motor coach immediately adjacent the front wall and in front of the front wheel well. The stairway cooperates with a hinged door mounted at the front wall and openable to an angle less than 90° from the coach side. The stairway is defined by a plurality of steps of equal riser height together with two vertical side walls each on a respective side of the stairway. The walls are smoothly curved around a center of curvature rearwardly of the stairway and to one side of the coach so that the stairway smoothly curves from a front edge at the doorway to a ramp section of the aisle commencing at a line at right angles to the side of the coach. The front edge of each step is at an angle to the front edge of the next step so that the steps provide gradual turning from the side of the coach to the front of the aisle. The stairway commences initially into the coach in a direction slightly toward the front of the coach so as to cooperate with the door in directing the passengers along the side of the coach, into the stairway, around the stairway and onto the aisle.

17 Claims, 3 Drawing Sheets

STAIRWAY FOR A MOTOR COACH

BACKGROUND OF THE INVENTION

This invention relates to a motor coach and particularly to a motor coach having a stairway which allows entry and exit by passengers between a door in one side wall adjacent a front wall and an aisle of a passenger compartment running rearwardly between two rows of passenger seats.

The present invention is particularly but not exclusively concerned with touring or highway motor coaches rather than transit buses. In the motor coach situation, the coach floor tends to be relatively high so that there is a significant distance between the first step at the door which is approximately sixteen inches from ground height in normal ride position.

It is generally not practical, particularly in Noah America, to provide two stairways for the motor coach which would allow entry through one stairway and exit through a second stairway. It is generally required that there be a single stairway at the front of the coach adjacent the driver so that the driver can properly monitor the entry and exit of passengers.

It is well known that the ridership of motor coaches of this type includes a relatively high number of elderly or physically challenged persons. It is highly desirable therefore that the stairway be designed to allow simple, intuitive and rapid entry and exit of such persons without requiring them to negotiate the steps slowly and with much turning. It will be appreciated that the time for loading and unloading the passengers is often wasted time in a busy schedule of travel and therefore such loading should be effected as quickly as possible but without risking tripping or falling by any of the passengers.

The typical stairway in conventional motor coaches includes a first portion of the stairway which is substantially at right angles to a center line of the coach following which there is a 90° turn part way up the stairway. This shape provides steps which are relatively narrow and usually are of varying heights and widths. In order to achieve the rise required from ground to floor using a minimum of space for the stairwell, the steps when conventionally arranged have a relatively high step height due to the ability to include a limited number of the steps which in practice is often five such steps. This type of stairway provides only poor ergonomics and therefore significantly slows the movement of passengers into the coach since those passengers must carefully negotiate each step in turn. While this often a minor matter for the youthful and physically able, persons with poor or weakened muscle control often must take very slow steps to ensure that the steps are properly negotiated without the danger of tripping or falling.

In many cases, this arrangement of steps requires that the driver platform be provided in a well or step down section from one of the steps so that it necessary for the driver to climb the steps and then to step down from the steps into a well. This is often difficult and cumbersome for the driver and provides an unattractive appearance in which the driver appears to be located downwardly from the steps in a well or pit.

SUMMARY OF THE INVENTION

It is one object of the present invention, therefore, to provide an improved stairway for a motor coach of the above general type.

According to one aspect of the invention there is provided a motor coach comprising a coach body having substantially parallel vertical coach sides, a coach roof and a coach floor defining therebetween a passenger compartment into which passengers can enter, two rows of passenger seats each arranged adjacent a respective one of the coach sides for receiving seated passengers, the rows being spaced to define a central aisle therebetween along which the passengers walk to access the seats, the coach body having a coach front with a windshield therein, ground wheels on which the coach body is supported for movement along a roadway including a pair of front ground wheels spaced rearwardly of the coach front with each ground wheel being arranged at a respective one of the coach sides, a door in one of the coach sides between the respective front wheel and the coach front for allowing entry to and exit from the passenger compartment of passengers, and a stairway providing a series of steps from the door to the aisle, the stairway being smoothly curved so as to turn gradually and continually from the door to the aisle.

This arrangement can therefore provide a stairway with steps of equal and reduced rise, increased average tread depth and smooth curvature. This is obtained in particular since the curvature of the stairwell allows the accommodation of one extra step in the same space thus reducing step height.

Preferably the stairway is of a double-curved design so that the first direction of the stairway is inward and slightly forward of the coach following which the stairway then curves rearwardly to join with the longitudinal aisle.

Preferably this arrangement provides the possibility of smoothly curved handrails which are much more convenient and suitable for grasping and following by the hand of the passenger, particularly where the passenger is of weakened or physically challenged condition.

The geometry greatly improves the flow of the passengers, is very efficient from a packaging prospective and allows a landing for the driver at a lower height than passengers to allow the passengers to view through the front windshield over the driver's head without obliging the driver to step down into a well.

The curvature of the stairwell operates particularly smoothly with a door which is angled outwardly and rearwardly from the side of the vehicle when opened since this tends to direct the passengers into the curved stairwell as they enter the vehicle as one smooth movement. However the curved stairwell of the present invention can also be used with other types of door including the plug door.

One embodiment of the invention will now be described in conjunction with the accompanying drawings in which:

BRIEF DESCRIPTION OF THE DRAWINGS

In the drawings like characters of reference indicate corresponding parts in the different figures.

DETAILED DESCRIPTION

Figure 1:
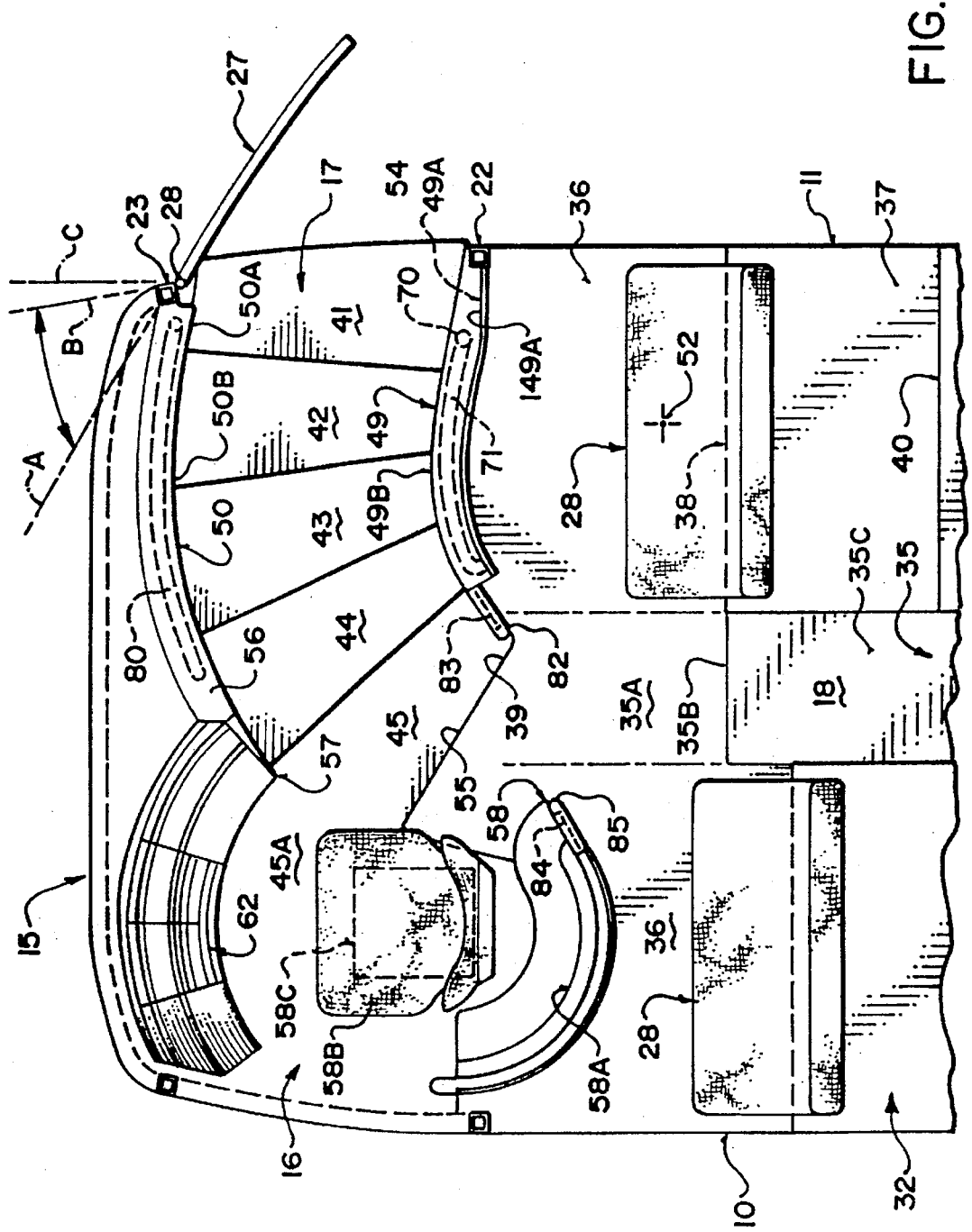
FIG. 1 is top plan view of the front section of a motor coach with the coach upper portion removed so as to show the entry stairway, the driver compartment and the front seating area.

A coach is shown schematically in the figures and includes coach sides 10 and 11 which are formed in conventional manner using frame members and covering panels, the details of which are not shown as these are well known to one skilled in the art. The coach further includes a roof structure 13 including a plurality of beams and covering panels again which are not shown for convenience of illustration. The rear area of the coach is not shown as this is of a conventional nature and again well known to one skilled in the art. At a front end of the coach is provided a front section 15 for housing a driver area 16 and an entry stairway 17 which allows the access of passengers to enter into and exit from a passenger compartment 18 defined within the coach sides and under the coach roof.

The main structural frame of the coach is again not shown as this is well known to one skilled in the art. A wheel arch section is indicated at 20 containing a ground wheel schematically indicated at 21. Again these features are shown only schematically as well known to one skilled in the art.

At the front of the main section of the coach is provided a main vertical post 22 which is located immediately forwardly of the wheel arch section 20. The post 22 defines a front edge of the coach sides which are generally vertical, parallel and planar from the post 22 rearwardly of the coach to the rear of the coach and lying in the same plane as the vertical post 22. Forwardly of the post is provided the front section 15. This includes two main support posts 23 which are shaped to define in effect one half of an arch commencing at an apex at the top of the post 22 and extending forwardly and downwardly therefrom to a bottom end of the post as indicated at 24 which is located at a bottom of the body of the front section and at the same height as the post 22. A horizontal beam 25 interconnected between an upper part of the post 23 and the post 22 so as to define an area for a doorway 26 to be closed by a door 27. The door 27 is mounted on hinges 28 carried on the post 23 so that the door is pivotal about a substantially vertical axis at the front of the front section of the coach and at the post 23. The door thus bridges the area 26 between the post 23, the beam 25 and the post 22 and is closable against those elements and the coach work panels defined thereover in a conventional manner well known to one skilled in the art.

A plurality of substantially horizontal beams 19 are attached to the posts 23 at spaced positions therealong so as to define a front panel of the coach. Thus the horizontal beams includes lower most beams 19 which are arch shaped and thus define a curved front face 29 of the coach from a structural bumper (not shown) up to a windshield 30. One of the horizontal beams 19 thus defines and supports the lower edge of the windshield and a further horizontal beam 19 is located at the top of the windshield. The windshield is thus curved upwardly and rearwardly and is also curved side to side as it follows the arch shape defined by the beams 19.

Figure 2:
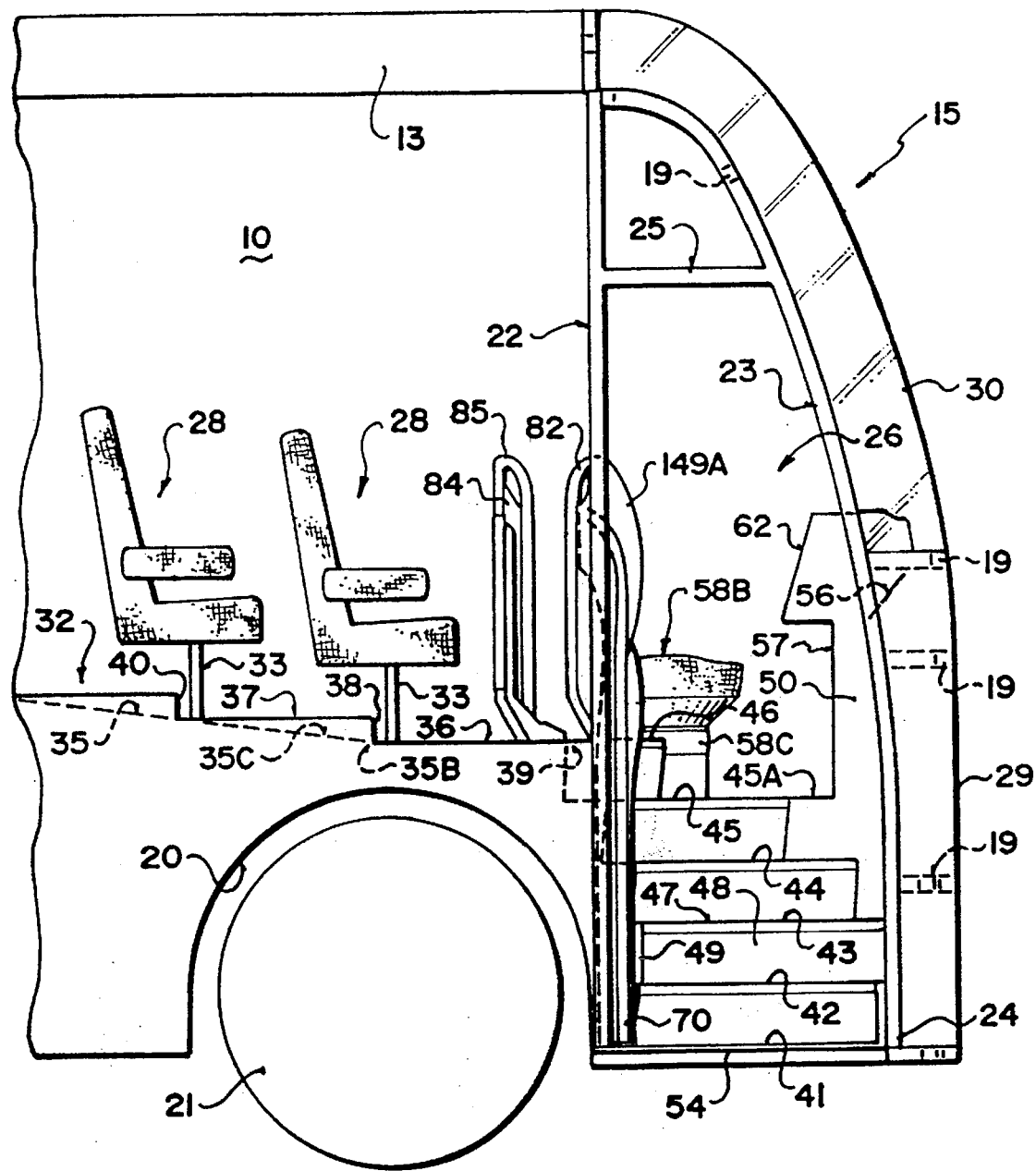
FIG. 2 is a side elevational view of the coach with the front framework of the coach omitted so as to expose the arrangement of the stairway visible behind the front framework.
Figure 3:
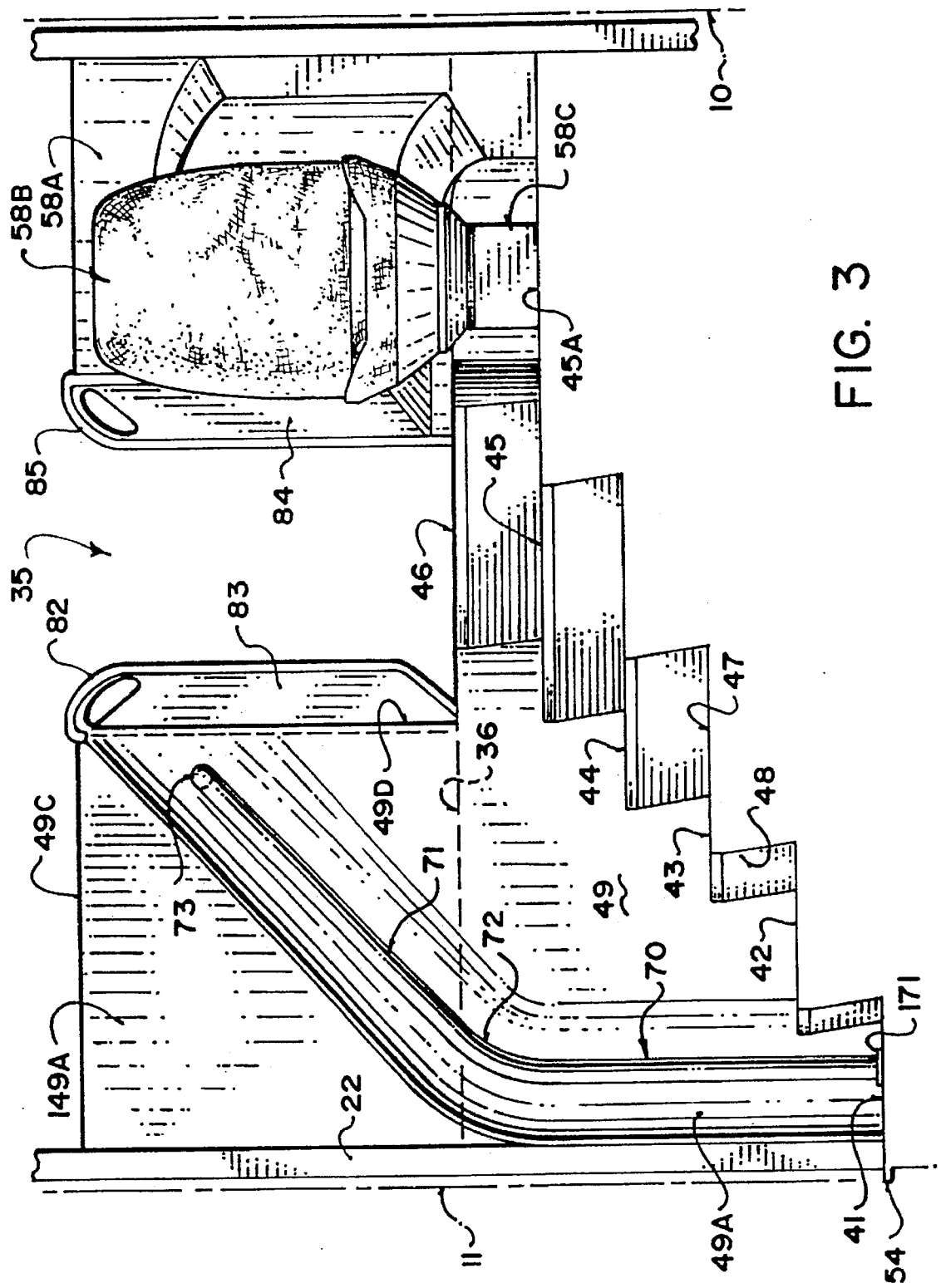
FIG. 3 is a front elevational view with the side panel and the door omitted to show the arrangement of the floor and seat within the coach interior.

The coach includes a coach floor generally indicated at 32 defining the floor of the passenger compartment on which the passengers can stand for moving about the passenger compartment and on which the seats indicated at 28 are located. The floor includes a central aisle 35 extending along the full length of the coach from the plane defined by the post 22 rearwardly. The central aisle is relatively narrow having a width only just sufficient to allow the passengers to move along the aisle to reach the seats which are arranged in two rows each on a respective side of the coach. In FIG. 2 two pairs of seats 28 are shown in one row including the forward most pair of seats immediately behind the plane containing the post 22 and the second rank of seats behind the front seats. In FIG. 1 the front seats only of the two rows are shown. The aisle is thus a relatively narrow strip of width of the order of 14 inches on which the passengers can walk.

Along a majority of the coach length, the floor on either side of the aisle is at a common height with the aisle and the pedestals 33 of the seats are located directly on the floor. At the front of the coach the first and second ranks of the seats are located on two surfaces indicated at 36 and 37. The surface 36 of the floor commences at a height equal to the forward most edge 39 of the aisle 35 and extends therefrom horizontally to a vertical riser 38 spaced rearwardly from the front edge. At the top of the vertical surface 38 is provided the second surface 37 which extends backwardly to a vertical riser 40. The steps position the front rank of seats slightly lower than the second rank of seats which are in turn slightly lower than the third rank of seats following which all of the seats are basically of a common height based on the horizontal floor. The aisle 35 includes a horizontal section 35A commencing at the front edge 39 a ramp section 35C connected to a rear edge 35B of the horizontal section and extending upwardly and rearwardly therefrom to a position where the aisle becomes horizontal at the height of the vertical step 40. Each of the steps 38 and 40 has a height of the order of three inches providing a ramp section rising by six inches which is approximately equal to the height of a conventional step.

The stairway 17 is shaped and arranged to provide a smooth entrance from the doorway at the side of the coach and forwardly of the post 22 upwardly and rearwardly onto the aisle. The stairway is defined by a plurality of individual steps 41, 42, 43, 44, 45 and 46. The number of steps thus comprises six steps but of course this can vary in accordance with particular designs. Each of the steps has a riser height which is equal to all of the other steps. Each of the steps is of a shape which includes a horizontal tread surface 47 with a vertical riser 48 at a rear of the tread surface. The riser 48 is not exactly vertical but is instead inclined slightly forwardly so that a front edge portion of the next step in the series of steps slightly overhangs a rear portion of the previous step to provide additional tread depth for the feet.

Each of the steps is defined at its sides by vertical side walls including a rear, inner side wall 49 and a front, outer side wall 50. The side walls are both smoothly curved generally about a centre of curvature arranged rearwardly of the plane containing the posts 22 and located approximately one quarter of the width across the coach from the side wall at the doorway. An approximate center of curvature is indicated at 52 although it will be noted that neither of the side walls 49 and 50 defines exactly an arc of a circle.

The curved side walls 49 and 50 thus define the path of the stairway and shape it in the substantially smooth curved shape so that the stairway extends from a lower most edge of the stairway at 54 at the front edge of the bottom step 41 which is generally parallel to the side of the coach to a top edge 55 of the stairway which is substantially at right angles to the edge 54 and is arranged at the beginning of the inclined ramp section 35 of the aisle. It will be noted that the top edge 55 of the top step 46 is not aligned with the aisle but is instead offset toward the opposite side of the coach from the doorway side of the coach. This positioning of the top edge of the stairway allows the stairway to turn through a relatively large curvature to allow the passengers to enter along the stairway through a relatively shallow curve so that they can enter substantially without being surprised by any change in direction. The top step is smoothly interconnected with the ramp section 35 of the aisle again so that the passenger is not surprised by the intersection between the stairway and the aisle.

Between the bottom edge 54 of the stairway and the top edge 55 of the stairway at right angles thereto, each front edge of each of the steps is arranged at an angle to that of the next so as to provide a gradual change of direction of the steps from the bottom step to the top step. Each step has a first side edge at the front outer wall 50 and a second side edge at the rear, inner wall 49. Thus each of the steps 42, 43, 44, 45 and 46 have a length of the second side edge along the rear inner wall 49 which is less than the length of the first side edge along the front outer wall 50. Thus the front edge of each step turns gradually from the front edge of the second step 42 at an increasing angle through to the rear edge 55 of the stairway.

The step 41 is however tapered in the opposite direction so that the length of the second side edge along the front outer wall 50 is less than the length first side edge of the first step 41 on the rear inner wall 49. The front edge of the step 42 is thus angled forwardly and slightly outwardly toward the side. The front edge of the step 41 is angled forwardly and inwardly to gradually narrow the step 41 towards the front outer wall 50.

It will be noted that the front edges of the steps lie approximately at right angles to a portion of the inner and outer walls 49, 50 at which the front edges intersect.

Both the rear, inner wall 49 and the front, outer wall 50 include a first portion 49A, 50A commencing at the edge 54 which portion is inclined inwardly of the side of the coach and forwardly of the coach. Thus, instead of the stairway being directed initially exactly at right angles to the side of the coach, it is directed slightly forwardly. The rear, inner wall 49 thus has a forward most apex 49B approximately at the front edge of the third step 43 and similarly the front, outer wall 50 has an apex 50B approximately aligned with the apex 49B on a line longitudinal of the coach. From that apex the walls curve inwardly and rearwardly toward the line 55.

This shape of the stairway thus leads the passenger slightly forwardly toward the front of the coach before turning the passenger gradually around to face the aisle directed rearwardly of the coach. This direction of the stairway cooperates with the angle of the door 27 in its open position to assist in directing the passengers in movement along the side of the coach forwardly of the coach toward the door 27 and then allowing the passengers to enter the stairway with a less abrupt change in direction as the passengers enter the stairway. It will be noted that in the open position of the door, the door is inclined at an angle A to the portion of the coach to which is attached and this portion is inclined at angle B to a line C longitudinal of the coach. In practice the angle A is of the order of 60° and the angle B is of the order of 10°. This orientation of the door thus directs the passenger as explained previously to smoothly turn into the stairway and then to smoothly follow the path of the stairway to the aisle.

The wall 49, formed as a lower panel and an upper modesty panel 149A, extends vertically upwardly from its position at the bottom defining the sides of the steps to a horizontal top edge 49C spaced above the floor 32. The portion of the wall 49 above the floor comprises the modesty panel for the passengers in the front seat. The wall 49 thus defines a portion of a cylinder intersecting the steps at its lower end and defining the modesty panel at its upper end. The wall 49 terminates at a vertical edge 49D extending upwardly from the inner, rear edge of the second from top step 45.

The wall 50, again formed in two pieces, similarly extends vertically upwardly from the steps and intersects with a dashboard surface 56 extending upwardly from the base of the windshield 30. The dashboard surface is inclined upwardly and rearwardly and intersects with the wall 50 at a height just above the bottom of the windshield. The wall 50 terminates at an apex 57 defining a vertical edge of the dashboard in front of the drivers area. Between the vertical edge 57 and a second vertical edge 58 there is an opening through which the driver can enter a driver's section on the opposite side of the coach. The edge 58 defines an outer edge of a curved modesty panel 58A or divider behind the driver's area and in front of the front seats on the same side as the driver. The panel is curved to form a part cylindrical wall having a center of curvature at a center of rotation of a swiveling driver's seat 58B.

The driver's section is defined by a platform 45A which is coplanar and contiguous with the step 45. The driver is therefore located on a platform which is simple to enter as it is part of one of the steps. The platform carries the driver's seat 58B mounted on a pedestal 58C. In front of the driver's seat is provided a curved console section 62 centered approximately on the driver's seat, which extends to the apex 57 interconnected with the wall 50 and again is illustrated only schematically. This provides an attractive appearance of the front end of the coach which smoothly interconnects the wall 50 defining the passenger entry section with the drivers console section of the dashboard 62.

Each side of the stairway has a hand rail for assisting the passengers in control of their movement along the stairway. The hand rail adjacent the wall 49 comprises a vertical post 70 mounted on a flange 171 carried on the bottom step 41 at a position immediately adjacent the wall 49 at the front of the step 41. The post 70 thus extends vertically upwardly at the front corner of the stairway and then turns into a tubular hand grip section 71 at a bend 72 at the top of the post 70. The tubular hand grip section again follows the curvature of the wall 49 within a recess in the molded modesty panel section 49A and also is inclined upwardly at the same angle as the steps so as to maintain a substantially constant height relative to the steps.

A part of the hand rail can be provided as a hand grip section 73 defined as a molded section of the wall 49A to form a C-shaped hand grip defined by recesses above and below the hand grip section into which the fingers of the user can extend for grasping the C-shaped hand grasp elements 73. The hand rail thus continues smoothly to the top rear corner of the wall 49 in the modesty panel.

The front hand rail on the front wall 50 is similarly shaped in that it includes a hand grip portion 80 attached to or molded into the wall 50 adjacent the doorway. The lower end of the tubular hand grip section 80 however does not include a post corresponding to the post 70. The tubular hand grip section 80 follows the curvature of the wall 50 and it is also inclined upwardly at the angle of the steps to maintain a constant height.

At the upper end of the hand rail 70 is provided a grab handle 82 mounted on a panel 83 and defined as an opening through the panel which defines an end portion of the modesty panel 49A and projects outwardly into the aisle at the inner end of the step 45.

At the end of the modesty panel 58A adjacent the upper edge 55 of the stairway is provided a second grab handle 85 in a panel 84. The grab handles 82 and 85 are thus approximately opposite at the top of the stairway and allow a person at the top step to grab with each hand on opposite sides of the stairway and aisle and then to pass between the grab panels into the aisle. The hands can also readily pass from the grab handles to the rails or vice versa to provide the possibility of support of the person while entering or leaving the stairway.

The shape of the rear inner wall 49 which curves from the doorway edge slightly forwardly to the apex 49B provides a section of the modesty panel which is bowed forwardly thus providing additional area for the knees and feet of the passengers in the front seat.

Since various modifications can be made in my invention as herein above described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. A motor coach comprising:

a coach body having substantially parallel vertical coach sides, a coach front with a windshield therein, a coach roof and a coach floor defining therebetween a passenger compartment into which passengers can enter;

two rows of passenger seats each arranged adjacent a respective one of the coach sides for receiving seated passengers, the rows being spaced to define a central aisle therebetween extending longitudinally of the coach body along which the passengers walk to access the seats; ground wheels on which the coach body is supported for movement along a roadway including a pair of front ground wheels spaced rearwardly of the coach front with each ground wheel being arranged at a respective one of the coach sides;

a door opening in one of the coach sides between the respective front wheel and the coach front for allowing entry to and exit from the passenger compartment of passengers;

a closable door panel for closing the door opening;

and a stairway providing a series of steps from a first step at the door opening to a last step at the aisle;

the stairway being smoothly curved so as to turn gradually and continually from the first step at the door to the last step at the aisle;

the stairway including a front, outer wall adjacent the coach front and lying on an outside of the curved stairway and a rear, inner wall lying on an inside of the curved stairway, each of the front, outer wall and the rear, inner wall being smoothly curved.

2. The motor coach according to claim 1 wherein each step has a substantially horizontal tread surface defining a horizontal front edge of the tread surface and wherein the front edge of each step is at an oblique angle to the front edge of a previous step in the series of steps.

3. The motor coach according to claim 1 wherein the rear, inner wall commences at the door opening in the coach side and includes a first portion extending from the door opening in a direction inwardly of the coach side and forwardly toward the coach front.

4. The motor coach according to claim 1 wherein the front outer wall commences at the door opening in the coach side and includes a first portion thereof extending from the door opening in a direction inwardly of the coach side and forwardly toward the coach front.

5. The motor coach according to claim 1 wherein the steps each include a front edge, a rear edge, a first side edge and a second side edge, the first side edges of the steps being arranged at front, outer side of the stairway and the second side edges being arranged at a rear, inner side of the stairway; wherein for each of the steps from a second step to the last step a length between a front edge of the step and the front edge of the next step at the front, outer wall is greater than a length between a front edge of the step and the front edge of the next step at the rear, inner wall.

6. The motor coach according to claim 1 wherein the rear, inner wall extends substantially vertically upwardly from a rear, inner edge of each step to a height above an adjacent passenger seating surface to define a modesty panel for passengers in a front one of the seats adjacent the stairway.

7. The motor coach according to claim 1 wherein the front, outer wall extends substantially vertically upwardly from a front, outer edge of each step to a position adjacent the bottom edge of the windshield.

8. The motor coach according to claim 1 wherein the number of steps from the first to the last is at least five.

9. The motor coach according to claim 1 wherein the steps each include a front edge, a rear edge, a first side edge and a second side edge, the first side edges of the steps being arranged at front, outer side of the stairway and the second side edges being arranged at a rear, inner side of the stairway;

the steps being shaped such that the front edge of each step lies at an oblique angle to the front edge of a previous step in the series of steps;

the first step being shaped such that the front edge thereof is at the door opening and such that the first side edge is shorter than the second side edge thereof;

the remaining steps being shaped such that the first side edge of each step is longer than the second side edge of the respective step.

10. The motor coach according to claim 9 wherein the door is mounted on the coach side for pivotal movement about a substantially vertical axis at the front, outer wall, the door in an opened position thereof being inclined outwardly and rearwardly from the coach side.

11. A motor coach comprising:

a coach body having substantially parallel vertical coach sides, a coach front with a windshield therein, a coach roof and a coach floor defining therebetween a passenger compartment into which passengers can enter;

two rows of passenger seats each arranged adjacent a respective one of the coach sides for receiving seated passengers, the rows being spaced to define a central aisle therebetween extending longitudinally of the coach body along which the passengers walk to access the seats;

ground wheels on which the coach body is supported for movement along a roadway including a pair of front ground wheels spaced rearwardly of the coach front with each ground wheel being arranged at a respective one of the coach sides;

a door opening in one of the coach sides between the respective front wheel and the coach front for allowing entry to and exit from the passenger compartment of passengers;

a closable door panel for closing the door opening;

and a stairway providing a series of at least five steps from a first step at the door opening to a last step at the aisle;

the stairway being smoothly curved so as to turn gradually and continually from the first step at the door to the last step at the aisle;

the stairway including a front, outer handrail adjacent the coach front and a rear, inner handrail, each of the front, outer handrail and the rear, inner handrail being smoothly curved with the stairway.

12. The motor coach according to claim 11 wherein the rear, inner handrail commences at the door opening in the coach side and includes a first portion extending from the door opening in a direction inwardly of the coach side and forwardly toward the coach front.

13. The motor coach according to claim 11 wherein the front outer handrail commences at the door opening in the coach side and includes a first portion thereof extending from the door opening in a direction inwardly of the coach side and forwardly toward the coach front.

14. The motor coach according to claim 11 wherein the steps each include a front edge, a rear edge, a first side edge and a second side edge, the first side edges of the steps being arranged at front, outer side of the stairway and the second side edges being arranged at a rear, inner side of the stairway;

the steps being shaped such that the front edge of each step lies at an oblique angle to the front edge of a previous step in the series of steps;

the first step being shaped such that the front edge thereof is at the door opening and such that the first side edge is shorter than the second side edge thereof;

the remaining steps being shaped such that the first side edge of each step is longer than the second side edge of the respective step.

15. The motor coach according to claim 14 wherein the door is mounted on the coach side for pivotal movement about a substantially vertical axis at the front, outer wall, the door in an opened position thereof being inclined outwardly and rearwardly from the coach side.

16. A motor coach comprising:

a coach body having substantially parallel vertical coach sides, a coach front with a windshield therein, a coach roof and a coach floor defining therebetween a passenger compartment into which passengers can enter;

two rows of passenger seats each arranged adjacent a respective one of the coach sides for receiving seated passengers, the rows being spaced to define a central aisle therebetween extending longitudinally of the coach body along which the passengers walk to access the seats;

ground wheels on which the coach body is supported for movement along a roadway including a pair of front ground wheels spaced rearwardly of the coach front with each ground wheel being arranged at a respective one of the coach sides;

a door opening in one of the coach sides between the respective front wheel and the coach front for allowing entry to and exit from the passenger compartment of passengers;

a closable door panel for closing the door opening;

and a stairway providing a series of steps from a first step at the door opening to a last step at the aisle;

the stairway being smoothly curved so as to turn gradually and continually from the first step at the door to the last step at the aisle;

the steps each including a front edge, a rear edge, a first side edge and a second side edge, the first side edges of the steps being arranged at front, outer side of the stairway and the second side edges being arranged at a rear, inner side of the stairway;

the steps being shaped such that the front edge of each step lies at an oblique angle to the front edge of a previous step in the series of steps;

the first step being shaped such that the front edge thereof is at the door opening and such that the first side edge is shorter than the second side edge thereof;

the remaining steps being shaped such that the first side edge of each step is longer than the second side edge of the respective step.

17. The motor coach according to claim 16 wherein the door is mounted on the coach side for pivotal movement about a substantially vertical axis at the front, outer side of the stairway, the door in an opened position thereof being inclined outwardly and rearwardly from the coach side.

* * * * *